United States Patent Office 3,108,887
Patented Oct. 29, 1963

3,108,887
REFRACTORY ARTICLES AND METHOD
OF MAKING SAME
Camille A. Lenie, Niagara Falls, and Kenneth M. Taylor, Lewiston, N.Y., assignors to The Carborundum Company, Niagara Falls, N.Y., a corporation of Delaware
No Drawing. Filed May 6, 1959, Ser. No. 811,282
10 Claims. (Cl. 106—62)

This invention relates to refractory bodies.

There is a great need in industry and commerce for refractory bodies that have good thermal shock resistance, good strength properties, and chemical inertness. Such bodies are required for structures that are subjected to sudden changes in temperature and pressure and to extremes of temperature and pressure.

For example, rocket nozzles and nozzle liners must be capable of withstanding a sudden change from room temperature or colder to extremely high temperature. Moreover, these parts must withstand the erosive force of an extremely hot and fast stream of gas, and in addition, must be substantially chemically inert so that there is no substantial chemical decomposition caused by reaction with the products of combustion of the rocket fuel.

Similar combinations of properties are needed in materials that are used for handling molten metals. In addition, materials that come in contact with molten metals must resist solution in the metals, and should be easy and inexpensive to fabricate into any shape that is needed.

One object of the present invention is to provide bonded bodies and shaped articles of manufacture of unusual and distinctive compositions and properties.

Another object of the invention is to provide refractory bodies or shapes having particular combinations of properties that heretofore have been unavailable in refractory compositions.

Another object of the invention is to provide practical methods and compositions for making such bodies and shapes.

A specific object of the invention is to provide a refractory material of new and distinctive characteristics that is particularly well-suited for exacting refractory applications, such as, for example, in the manufacture of parts for rocket motors such as rocket nozzles, and in the handling of molten metals.

Another object of the invention is to provide a refractory material of the character described, that is further characterized by very limited solubility in many molten metals.

A further object of the invention is to provide a refractory material of the character described, that is resistant to erosion and corrosion.

Other objects of the invention will be apparent hereinafter from the specification and from the recital of the appended claims.

We have found that a refractory material, having the desired characteristics, can be obtained by subjecting finely divided aluminum nitride to certain pressures and temperatures simultaneously, to transform the finely divided aluminum nitride into an exceptionally dense, hard, strong, and chemically inert body. We have also found that other materials, in finely divided state, can be mixed with the aluminum nitride to form dense bodies with extremely desirable properties.

One preferred refractory, made in accordance with our invention, consists of substantially pure aluminum nitride, and has a density that is very close to the theoretical density of a body of non-porous pure aluminum nitride. The actual density of a refractory body, made in accordance with our invention from substantially pure aluminum nitride, is equal to at least 90% of the theoretical density of a non-porous body of pure aluminum nitride, and frequently, is 98% and even more of this theoretical density.

In practice, it is difficult to obtain aluminum nitride that has a purity of greater than about 95%. Because of the refractoriness of the aluminum nitride and the impurities therein, it is quite difficult to purify the aluminum nitride further. Consequently, the aluminum nitride that is available generally contains about 2% by weight of aluminum oxide, together with small amounts of other impurities. These do not seem to have any detrimental effect on the characteristics of the refractory bodies, and in fact, their presence may be beneficial since there is some indication that the presence of small amounts, at least, of aluminum oxide has a beneficial effect during compaction of the refractory material.

Aluminum nitride is difficult to compact, to form it into dense bodies. Aluminum nitride sublimes or decomposes without melting, at about 2400° C. Vaporization begins, at a low but observable rate, in the range of 2050° C. to 2100° C. However, we have found that aluminum nitride can be compacted successfully, to form strong dense bodies, when the aluminum nitride is combined with a refractory oxide such as, for example, the oxide of aluminum, titanium, or zirconium, to name a few of the preferred oxides only.

In its broader aspects, therefore, our invention contemplates dense strong refractory bodies containing aluminum nitride and, in addition, one or more compounds having the empirical formula MX, where M is different from X and is selected from the group consisting of aluminum, boron, silicon, the rare earths, and the refractory transition metals, and X is selected from the group consisting of oxygen, boron, nitrogen, silicon, and carbon.

The term "refractory transition metal," as used in the specification and claims of this application, means the transition metals of the fourth, fifth, and sixth groups of Mendeleeff's Periodic Table, namely, titanium, zirconium, hafnium, thorium, vanadium, columbium, tantalum, protoactinium, chromium, molybdenum, tungsten, and uranium.

The raw batch, from which refractory bodies can be made in accordance with our invention, must contain particles that are finely divided. Good results are obtained, with a raw batch consisting essentially of aluminum nitride, when the aluminum nitride particles are predominantly below 10 microns in size. In a typical raw batch of aluminum nitride, for example, a particle size might fall in the range from 0.5 microns to 25 microns, with the bulk of the particles, say about 80% by weight, falling in the size range from 0.5 microns to 5 microns. In general, it is preferred that the particle size be below 5 microns. Finer states of subdivision can be employed, but are difficult to obtain economically.

When other substances, of the type described above, are used in combination with the aluminum nitride, the particles of the other substance or substances must also be finely divided. Good results are obtained when the majority of the particles do not exceed 10 microns in size, but it is preferred that the majority of particles fall below 5 microns in size.

To make our refractory bodies, a raw batch, such as, for example, a batch of aluminum nitride particles having a size predominantly below 10 microns, is subjected to a pressure of at least 500 p.s.i., and preferably over 1000 p.s.i., at a temperature in the range of 1600° C. up to about 2200° C., and preferably, in the range of 1800° C. to about 2000° C.

The refractory bodies of our invention have characteristics that render them particularly suitable for use in the manufacture of rocket nozzles and parts for rocket motors. They are also useful for handling molten aluminum at high temperatures, particularly for remelting aluminum, and, as well, they are useful for melting other metals such as, for example, silicon. The electrical characteristics of some of these bodies make them particularly suited for many electrical insulating applications at high temperatures, where thermal-shock conditions exist that are too severe for other refractory materials such as, for example, alumina.

Our bodies are also useful materials for handling molten glass. They can be fabricated into containers for holding molten glass, and into orifices for the passage of molten glass. They are also useful in the fabrication of mechanical parts of all types that are subjected to thermal shock and that must resist dissolution, erosion, corrosion, and abrasion. A typical application of this type, for example, is a pump part that is in direct contact with a molten metal.

PREPARATION OF ALUMINUM NITRIDE

We prefer to prepare aluminum nitride substantially in accordance with the following general procedure.

A very finely divided aluminum powder, having a particle size of 325 mesh and finer, U.S. Standard Sieve, and having a purity of 99% aluminum or better, is placed in a refractory container together with about 1% to 5% by weight of a catalyst. Among the catalysts that can be employed are lithium fluoride, potassium fluoride, potassium hydrogen fluoride, sodium nitrite, and the like, and other catalysts as taught, for example, in British Patent 784,126, published October 2, 1957. We prefer to use 3% by weight of sodium fluoride.

The aluminum and the catalyst, in their refractory container, are placed in a furnace, such as, for example, a furnace that is heated by silicon carbide electrical resistance heating elements. The temperature is raised rapidly to 650° C., and then is held at about 650° C. for approximately 16 hours (overnight). A nitrogen atmosphere is maintained in the furnace. The temperature is then raised to about 1050° C., and held there for 8 hours, then is raised again to about 1400° C. in four hours and held there for about 12 hours. The furnace is then permitted to cool. The nitrogen atmosphere is maintained during cooling. The cooling may take 10 or 12 hours, depending on the particular furnace and the size of the charge in the furnace.

The aluminum nitride in the refractory container is unstable in the presence of water, and exhibits some tendency to hydrolize even in the presence of atmospheric moisture. It is therefore heat-treated to stabilize it, by heating it to about 1850° C., but over 1600° C., and holding it at that temperature for a short time, such as 20 minutes or one-half hour. It is not clear what effect this heat treatment has, but there is a definite stabilization. This may be attributable to crystal growth, or to the formation of a thin oxide layer. There is some indication that the temperature should not be raised much above 1900° C. while stabilizing the aluminum nitride. If higher temperatures are employed, difficulty is often observed in compacting the aluminum nitride into dense bodies.

The stabilized aluminum nitride is reduced in size to the range ½ micron to 25 microns. To do this, the aluminum nitride is ball-milled. A stainless steel mill, having stainless steel balls, gives satisfactory results. Milling is continued preferably until the bulk of the aluminum nitride has a size below 5 microns. Particles of aluminum nitride having a size ranging up to 60 microns, with the bulk of the particles falling in the range 5 microns to 10 microns, can be employed and give satisfactory bodies; but the smaller particle size, in which the bulk of the particles is below 5 microns, is preferred.

Pure aluminum nitride theoretically contains 65.9% by weight of aluminum, and 34.1% by weight of nitrogen. The particles of aluminum nitride that we obtained, after ball-milling, had the following chemical analysis.

Chemical analysis of aluminum nitride particles:

|  | Percent |
|---|---|
| Aluminum | 64.8 |
| Nitrogen | 32.8 |
| Carbon | 0.2 |
| Silicon | 0.4 |
| Iron | 0.1 |
| Oxygen | 1.0 |

On the basis of this chemical analysis, the aluminum nitride powder has the following calculated composition.

Calculated composition of the aluminum nitride powder:

|  | Percent |
|---|---|
| Aluminum nitride | 96.0 |
| Aluminum oxide | 2.1 |
| Other compounds | 1.9 |

The actual density of the aluminum nitride powder is 3.23 g./cc.

PRODUCTION OF REFRACTORY BODIES

Example 1

To make a dense hot pressed body from the aluminum nitride powder, a graphite die having a desired shape is filled with a charge of the powder. The charged die is placed in an induction furnace and the temperature is raised rapidly to 1400° C., and at 1400° C., the first application of pressure is made to the mold. Initially, 500 p.s.i. is applied. The temperature and pressure are then increased simultaneously. At about 1750° C., full pressure, 4000 p.s.i., is applied. This pressure is applied continuously as the temperature is raised from about 1750° C up to 2000° C.

The exact amount of time that is required depends on the size of the piece that is being produced. In general, rapid heating is preferred and seems to give superior results. Slow heating appears to permit crystal growth.

During heating, normal furnace atmosphere is maintained, and at the tempertaures used, normal furnace atmosphere is a mixture of nitrogen and carbon monoxide. An atmosphere of purified nitrogen can be maintained, but does not seem to be essential. The presence of atmospheric oxygen should be avoided.

At the end of the heating and pressing schedule, the piece is permitted to cool in the furnace to room temperature. Pressure may be maintained during cooling, but is not necessary. Aluminum nitride tends to shrink away from the mold as it cools.

Commercial hot-pressing furnaces can be employed to effect compaction of the aluminum nitride. The most common types of furnaces in commercial use, for the hot pressing of refractory materials, can provide temperatures ranging from 1500° C. to 2600° C., and pressures on the order of 2000 p.s.i. up to 10,000 p.s.i. We have found that good dense bodies cannot be produced at pressures below 500 p.s.i., and we prefer to use pressures above 1000 p.s.i. Bodies that are produced at temperatures below 1600° C. are not dense. For example, a body produced at slightly below 1600° C. may have a density that is only two-thirds of the theoretical density of a non-porous pure body of the same composition.

Prolonged exposure of the piece during compaction, to temperatures above 2200° C., is to be avoided, since this also produces low density pieces. The vaporization rate of aluminum nitride at temperatures above 2200° C. is appreciable, and exposure of a piece to a temperature of 2200° C. or higher may result in a piece with a porous outer layer. Such a porous piece may be soft to a depth of 1/32 of an inch or even 1/16 of an inch.

The working pressure preferred is 4000 p.s.i. to 6000 p.s.i. Higher pressures can be employed, however. In general, the pressure that can be used is limited by the strength of the die.

The aluminum nitride piece obtained is gray or light gray in color. It has a measured actual density of 3.2 g./cc., which is 98% of the thoretical density of 3.26 g./cc. that is calculated from unit cell dimensions as determined by X-rays. The piece has a hardness of 7 to 8 on Mohs' scale and Knoop hardness of 1200 at a load of 100 grams.

The electrical properties in general, and particularly the dielectric constant, are similar to high density alumina. The D.C. resistivity at 100° C. is $10^{14}$ ohm-cm., and at 700° C. is $10^7$ ohm-cm.

Other typical physical characteristics of aluminum nitride dense refractory bodies, as determined on specimens prepared in the manner described above, are presented in the following tables.

TABLE 1.—STABILITY AT ELEVATED TEMPERATURES

[Test specimens, ¼″ x ½″ x ½″]

| Atmosphere | Temperature, °C. | Time, Hours | Conversion to other Compounds, percent by weight |
|---|---|---|---|
| Air | 1,000 | 30 | 0.3 aluminum oxide. |
| Air | 1,400 | 30 | 1.3 aluminum oxide. |
| Air | 1,700 | 4 | 10.6 aluminum oxide. |
| Oxygen | 1,400 | 30 | 0.9 aluminum oxide. |
| Dry steam | 1,000 | 30 | 0.3 aluminum oxide. |
| Chlorine | 500 | 30 | less than 0.1 aluminum chloride. |
| Chlorine | 700 | 30 | 19.2 aluminum chloride. |
| Hydrogen | 1,700 | 4 | nil. |

TABLE 2.—STRENGTH AND ELASTICITY

[Test specimens, ¼″ x ½″ x 3″]

| Temperature, °C. | Modulus of Rupture, p.s.i. | Modulus of Elasticity, p.s.i. |
|---|---|---|
| 25 | 38,500 | $50 \times 10^6$ |
| 1,000 | 27,000 | $46 \times 10^6$ |
| 1,400 | 18,100 | $40 \times 10^6$ |

The modulus of rupture at room temperature compares with a value of 11,500 p.s.i. that has been obtained by other investigators for cold pressed and sintered bodies of aluminum nitride.

TABLE 3.—THERMAL EXPANSION

| Temperature Range, °C. | Linear Expansion, Cm./Cm./°C. $\times 10^{-6}$ |
|---|---|
| 25–200 | 4.03 |
| 25–600 | 4.84 |
| 25–1,000 | 5.64 |
| 25–1,350 | 6.09 |

TABLE 4.—THERMAL CONDUCTIVITY

[Test specimens, ½″ Diameter x 3″ Long]

| Temperature, °C. | Calories/Cm.²/Cm./Sec./°C. | B.t.u./Ft.²/In./Hr./°F. |
|---|---|---|
| 200 | 0.072 | 209 |
| 400 | 0.060 | 173 |
| 600 | 0.053 | 153 |
| 800 | 0.048 | 139 |

TABLE 5.—CORROSION RATE IN WATER AND MINERAL ACIDS

[Specimens ¼″ x ½″ x ½″, in 600 ml. of liquid for 72 hours]

| Corrosive Liquid | Temperature, °C. | Corrosion Rate, Mils/year |
|---|---|---|
| Water | 100 | 14 |
| Concentrated hydrochloric acid | 72 | 320 |
| 1 part concentrated hydrochloric acid with 1 part water | 110 | 570 |
| Concentrated sulfuric acid | 305 | 180 |
| 1 part of concentrated sulfuric acid with 1 part water | 145 | 550 |
| Concentrated nitric acid | 120 | 150 |
| 1 part concentrated nitric acid with 1 part water | 111 | 200 |
| 1 part hydrofluoric acid with 1 part nitric acid, both concentrated | 57 | 160 |
| 1 part concentrated hydrofluoric acid with 1 part water | 57 | 215 |

The thermal shock resistance of the bodies is very good, and is superior to high density aluminum oxide. After 30 cycles of rapid change of a test piece from room temperature to 1400° C. and back to room temperature again, the strength loss, as determined from the modulus of rupture, was only 12%. A test bar that is moved in and out of an oxyacetylene flame repeatedly, alternately to cool and to heat it, shows no evidence of cracking or spalling after several of these thermal cycles.

As a further test of the corrosion resistance of the material, a specimen having a size of ¼″ x ½″ x ½″ was submerged in molten boron oxide in a platinum crucible for 4 hours at 1000° C. The weight loss was only 0.02%, which is equivalent to a corrosion rate of 170 mils per year.

To determine resistance to corrosion or dissolution in molten aluminum and molten cryolite, a test piece was heated for 66 hours at 1200° C. in a graphite crucible, in a mixture of molten aluminum and molten cryolite, in an argon atmosphere. There was no observable corrosion.

Because of the excellent resistance of dense, compacted aluminum nitride made in accordance with our invention, it is an excellent material for use in the fabrication of parts that may come in contact with the gases of a rocket engine utilizing a high energy boron fuel. Moreover, the excellent resistance to molten cryolite and molten aluminum indicates that the dense aluminum nitride bodies are good materials for use in the fabrication of parts for contact with molten cryolite or molten aluminum.

*Example 2.—Dense Hot-Pressed Bodies Made from a Mixture of Aluminum Nitride and Aluminum Oxide*

A mixture of approximately 80 parts by weight of aluminum nitride, prepared in the manner described above, and 20 parts by weight of a pure aluminum oxide is milled to reduce the particle size so that the particles are predominantly below 5 microns.

The milled mixture is placed in a graphite die and compacted at about 1950° C. under a pressure of 2000 p.s.i. The body obtained has a low porosity and a very high compressive strength, on the order of about 300,000 p.s.i.

This body also has excellent resistance to oxidation and to molten cryolite. This is quite unexpected since alumina is readily dissolved by molten cryolite.

To permit comparison with the dense, hot-pressed bodies obtained from substantially pure aluminum nitride, the physical properties of several specimens prepared in accordance with the technique described above, containing about 80% aluminum nitride and 20% alumina, are described in the following table:

TABLE 6.—THERMAL EXPANSION

| Temperature Range, °C. | Linear Expansion, Cm./Cm./°C. $\times 10^{-6}$ |
|---|---|
| 25–200 | 3.89 |
| 25–600 | 5.07 |
| 25–1,000 | 5.87 |
| 25–1,350 | 6.13 |

The thermal conductivity is slightly lower than the conductivity for aluminum nitride dense compacted bodies. For example, at 400° C., the thermal conductivity in calories/cm.²/sec./°C./cm. is 0.51.

The modulus of elasticity is roughly half that of aluminum nitride dense compacted bodies. The modulus of rupture is about two-thirds that of the aluminum nitride body at room temperature, about the same at 1000° C., and slightly higher at 1400° C.

In substantially the same manner as described in Example 2, but in any proportions desired, dense compacted bodies can be made from mixtures of aluminum nitride powder and powders of boron nitride, silicon carbide, molybdenum disilicide, silicon nitride, titanium nitride, zirconium nitride, silicon dioxide, titanium dioxide, zirconium dioxide, thorium dioxide, uranium dioxide, magnesium oxide, the rare earth oxides, and mixed oxides such as, for example, mixed oxides of magnesium and silicon, and of aluminum and silicon.

It is not necessary that a major part of a raw batch mixture be powdered aluminum nitride. For many applications relatively small amounts of aluminum nitride can be employed in the batch, and excellent bodies may be obtained. However, in most cases, it is contemplated that the aluminum nitride will comprise the major part of the mixture, that is, in excess of 50% by weight of the mixture. To obtain the highly desirable refractory characteristics of compacted aluminum nitride, it is preferred that the aluminum nitride powder comprise at least 90% by weight, and preferably 95% by weight, of the raw batch mixture.

The several mixtures that are suggested above, for raw batch use in the preparation of dense refractory bodies in accordance with this invention, have general refractory applications. In addition, specific raw batch combinations may be selected in order to obtain refractory bodies for special applications, such as the nuclear power field, for example. Thus a raw batch mixture of aluminum nitride and uranium dioxide powders, or alternatively, of aluminum nitride, uranium dioxide, and aluminum oxide, may be employed for the preparation of desirable nuclear fuel elements. The combinations of aluminum nitride with the rare earth oxides may be employed in the preparation of dense refractory bodies that are effective as shielding or control elements.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

We claim:

1. As a new article of manufacture, a dense, strong, corrosion-resistant, hot pressed body consisting essentially of aluminum nitride, the actual density of said body equalling at least 90% of the theoretical density of a non-porous body of aluminum nitride.

2. As a new article of manufacture, a dense, strong, corrosion-resistant, hot pressed body consisting essentially of aluminum nitride in an amount in excess of 50% and aluminum oxide, the actual density of said body equalling at least 90% of the theoretical density of a non-porous body of the same composition.

3. An article of manufacture as set forth in claim 2 in which the aluminum nitride is present to the extent of at least 95%.

4. As a new article of manufacture a dense, hot pressed body consisting essentially of in excess of 50% of aluminum nitride and uranium oxide.

5. As a new article of manufacture a dense, hot pressed body consisting essentially of in excess of 50% of aluminum nitride, uranium oxide, and aluminum oxide.

6. A method of making a dense, shaped aluminum nitride article which comprises simultaneously pressing and heating at a pressure of at least 500 p.s.i. and at a temperature in the range 1600° C. to about 2200° C., a raw batch consisting essentially of aluminum nitride particles that are predominantly below 10 microns in size.

7. A method of making a dense, shaped, bonded aluminum nitride body which comprises simultaneously pressing and heating at a pressure of at least 500 p.s.i. and at a temperature in the range 1600° C. to about 2000° C. a raw batch consisting essentially of not less than 50% of aluminum nitride, the particles of which are predominantly below 10 microns in size, and finely divided particles of a nonmetallic refractory compound selected from the group consisting of boron nitride, silicon nitride, titanium nitride, zirconium nitride, silicon carbide, molybdenum disilicide, silicon dioxide, titanium dioxide, zirconium dioxide, thorium dioxide, uranium dioxide, aluminum oxide, the rare earth oxides, and magnesium oxide and mixtures of such oxides.

8. A method as set forth in claim 7 in which the refractory compound used is aluminum oxide.

9. A method as set forth in claim 7 in which the refractory compound used is uranium oxide.

10. A method as set forth in claim 7 in which the refractory compound used is a mixture of aluminum oxide and uranium oxide.

References Cited in the file of this patent

UNITED STATES PATENTS

| | | |
|---|---|---|
| 2,406,275 | Wejnarth | Aug. 20, 1946 |
| 2,480,475 | Johnson | Aug. 30, 1949 |
| 2,568,157 | Sepp et al. | Sept. 18, 1951 |
| 2,839,413 | Taylor | June 17, 1958 |
| 2,929,126 | Bollack et al. | Mar. 22, 1960 |
| 2,979,414 | Ryshkewitch et al. | Apr. 11, 1961 |